Jan. 19, 1965   A. W. KAPLAN   3,165,957
PLASTIC TUBE CUTTER AND DISPENSER
Filed Nov. 1, 1961   2 Sheets-Sheet 1
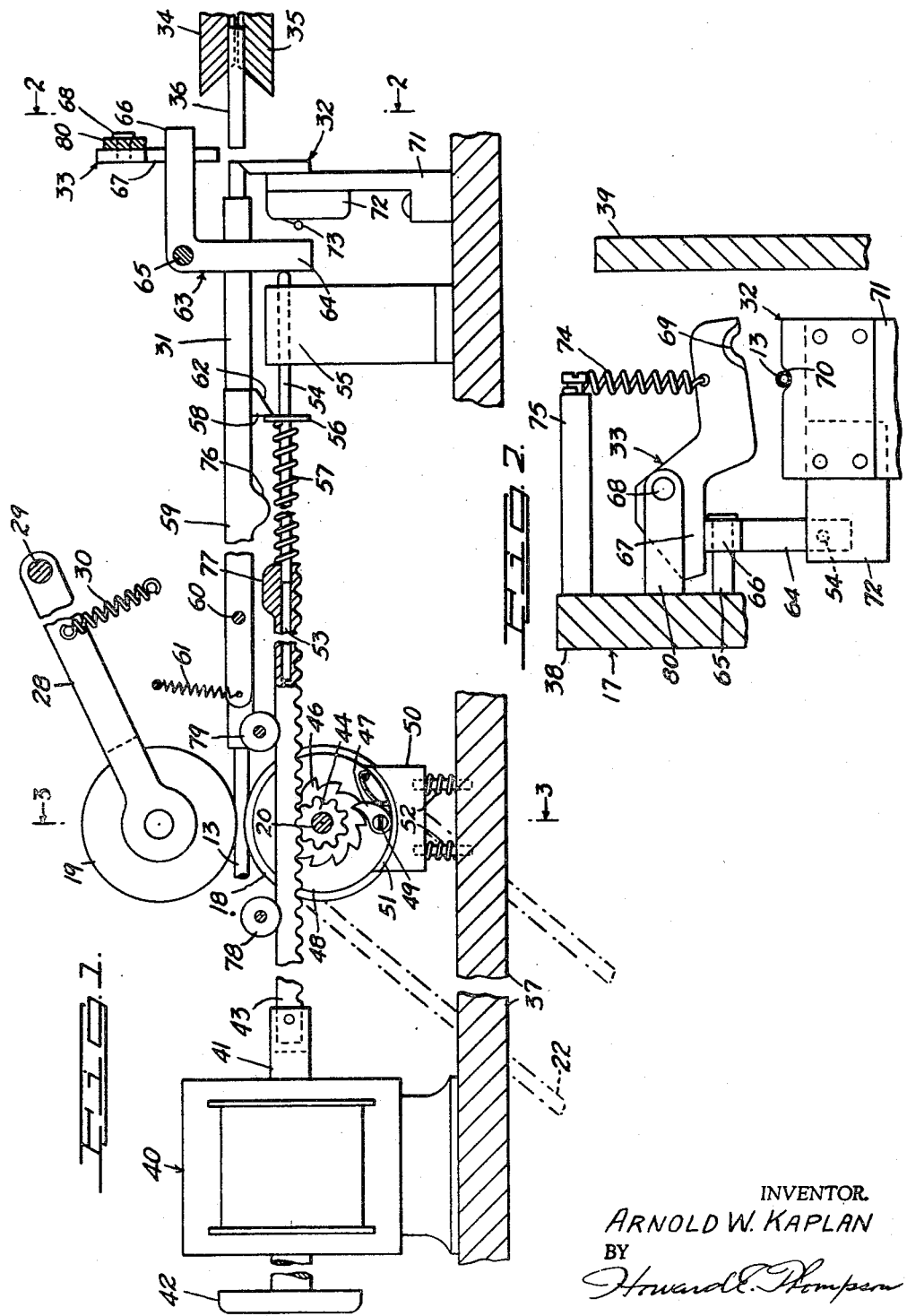
INVENTOR.
ARNOLD W. KAPLAN
BY
Howard E. Thompson
ATTORNEY Jan. 19, 1965  A. W. KAPLAN  3,165,957
PLASTIC TUBE CUTTER AND DISPENSER
Filed Nov. 1, 1961  2 Sheets-Sheet 2
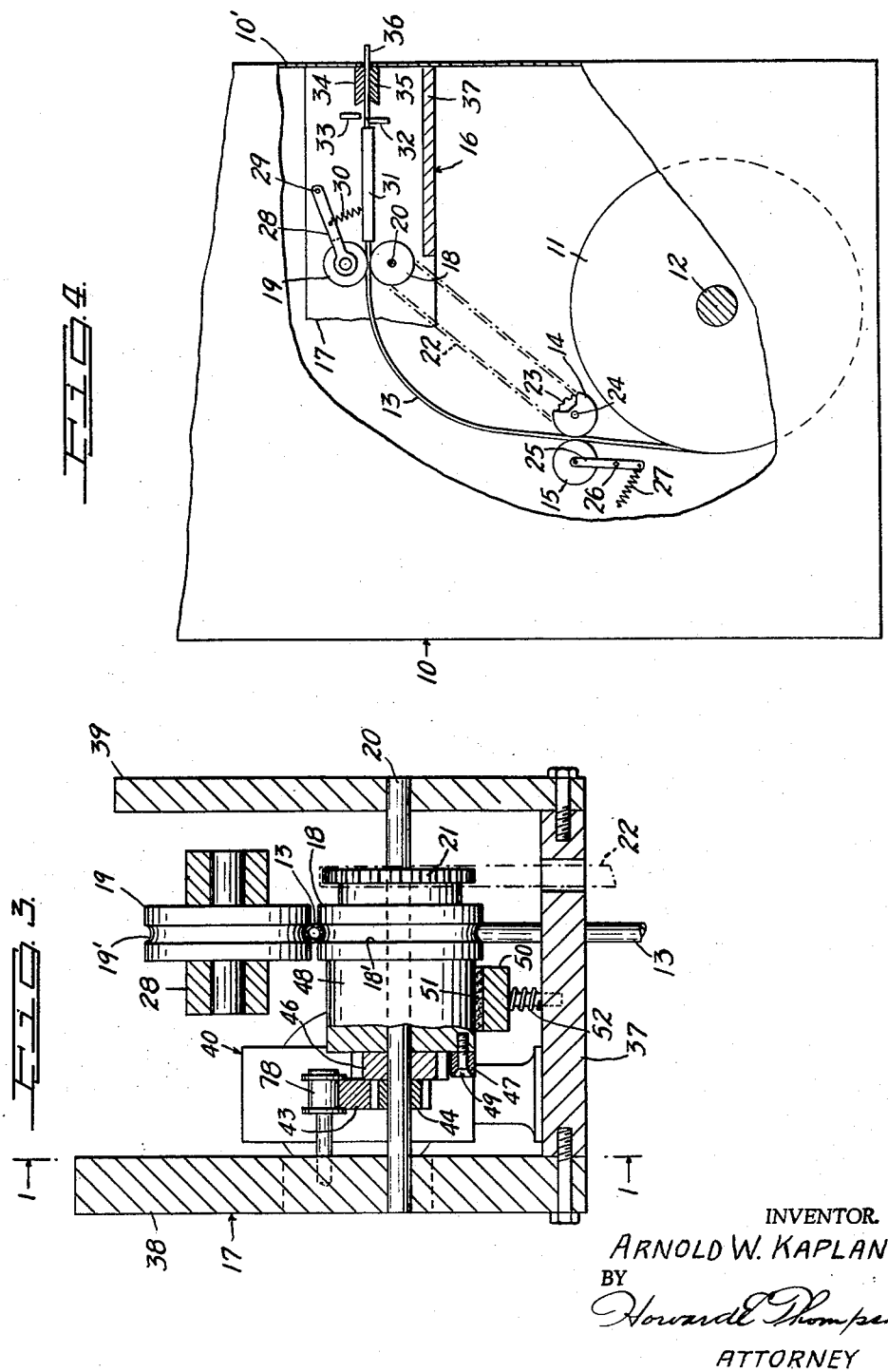
INVENTOR.
ARNOLD W. KAPLAN
BY
*Howard Thompson*
ATTORNEY

United States Patent Office

3,165,957
Patented Jan. 19, 1965

3,165,957
PLASTIC TUBE CUTTER AND DISPENSER
Arnold W. Kaplan, Brooklyn, N.Y., assignor to Jay Dee Products Co., Inc., Brooklyn, N.Y., a corporation of New York
Filed Nov. 1, 1961, Ser. No. 149,325
7 Claims. (Cl. 83—167)

This invention relates to a device or apparatus for dispensing plastic tubular drinking straws, wherein the plastic tubular material from which the straws are formed is stored on a spool and fed from the spool to a cutting and straw supporting station, from which the cut straw can be manually removed.

More particularly, the invention deals with a device or apparatus of the character described, which can be built into or formed a part of a liquid vending machine, vending drinks of various types and kinds.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side and sectional view of a device or apparatus made according to my invention, with parts of the structure broken away and parts shown in section, the view being generally along the line 1—1 of FIG. 3 and omitting the background.

FIG. 2 is a partial sectional view, generally along the line 2—2 of FIG. 1, illustrating the cutter tools for severing the plastic tubing in forming the tubular straws.

FIG. 3 is a section on the line 3—3 of FIG. 1, with parts of the construction shown in elevation; and FIG. 4 is a diagrammatic side view of part of a vending machine broken away in illustrating an arrangement of my improved straw forming and dispensing device or mechanism, the showing of the mechanism in FIG. 4 being entirely schematic and eliminating the structural details which are shown more fully in FIG. 1 of the drawing.

In illustrating one adaptation and use of my invention, I have diagrammatically or schematically illustrated at 10 in FIG. 4 of the drawing the outline of a vending machine, in which a spool of plastic tubing is indicated at 11 rotatable about a suitably supported shaft 12. 13 illustrates the plastic tubing extending from the spool which is fed from the spool by a pair of rollers 14, 15. At 16 I have outlined briefly in FIG. 4 of the drawing part of the mechanism of the cutting and dispensing mechanism, which includes a suitable frame 17, in which are supported another pair of rollers 18 and 19, the roller 18 being a driven roller and on the shaft 20 of this roller is a chain sprocket 21, note FIG. 3, over which a chain passes, the chain being indicated in dot-dash lines at 22 in the several showings thereof, this chain passing around a similar sprocket 23 on the shaft 24 of the roller 14, so that both rollers 14 and 18 are driven in synchronism for feed of the plastic tubing 13.

The roller 15 is mounted on an arm 25, pivoted as seen at 26, and coupled with the free end of the arm 25 is a spring 27 which urges the roller 15 in constant tensional engagement with the tube 13.

It will also appear, from a consideration of FIGS. 1, 3 and 4, that the roller 19 is supported in a yoke-shaped arm 28, pivoted, as seen at 29, the spring 30 being employed to maintain the roller 19 in tensional engagement with the tube 13. All of the rollers 14, 15, 18 and 19 are grooved to engage the tube and the grooves of the rollers 18 and 19 only are shown clearly in FIG. 3 of the drawing. The groove of the roller 18 is indicated at 18' and the groove of the roller 19 is indicated at 19' and, if desired, the surface of the grooved area can be roughened or formed in any desired manner to establish a positive engagement with the plastic tube 13.

Suitably supported in the frame 17 is an elongated guide tube 31, through which the tubing 13 passes to aline the same with the stationary cutter 32 and the pivoted cutter 33. As previously stated, the showing in FIG. 4 of the drawing is schematic and limited in outlining primarily the essential parts for feed and guidance of the tubing 13 and at 34 and 35 are shown upper and lower supports for the formed workpiece or straw 36 in a projected manner beyond the wall 10' of the vending machine to be accessible for removal by the purchaser of a drink vended by the machine 10.

At this time, it is pointed out that the operation of my improved device or apparatus will be tied-in with the control mechanisms of the vending machine, so as to automatically put the straw dispensing device or mechanism into operation to dispense the straw 36 simultaneously in dispensing of the drink. In this connection, it will also be apparent that, in some instances, the purchaser would not require the use of a straw, even in the dispensing of some bottled or container liquids. Accordingly, in such instances, the machine could include a manually actuated button, lever or the like which would be operable during the cycle of operation of the vending machine so that, by manual actuation of the button, lever or the like, a straw could be dispensed. As operations and controls of this type and kind are well-known in the art, no need for disclosure of the same is deemed to be necessary in order for those skilled in the art to understand the uses and operation of the dispensing device or apparatus. At this time, it is also to be kept in mind that the device or apparatus can be utilized in many other ways for dispensing straws or other workpieces in which the feed mechanism, later described, can be electrically and/or manually operated.

Now, turning to the more complete showing of the device or apparatus in FIGS. 1, 2 and 3 of the drawing, it will appear that the frame 17 comprises a baseplate 37 and two upwardly extending side plates 38 and 39, clearly shown in FIG. 3 of the drawing.

Supported on the base plate 37 is a push-type solenoid, diagrammatically seen at 40 in FIG. 1 of the drawing, the solenoid being electrically actuated through the electrical mechanism when an arrangement, such as outlined in FIG. 4, is employed, the solenoid actuating a shaft 41. The shaft 41, beyond the left side of the solenoid 40, as shown in FIG. 1, includes a large head 42 and, in manually operated devices, the head can be a push-button for actuating the shaft 41 and the solenoid 40 can simply be a bearing support for this shaft.

Coupled with the shaft 41 is an elongated rack bar 43, the rack of which engages a pinion 44 fixed to the shaft 20 supported in the side walls 38 and 39, as clearly seen in FIG. 3 of the drawing. Also fixed to the shaft 20 is a ratchet wheel 46, in connection with which a spring actuated pawl 47 operates, the pawl being pivoted to one side of a drum extension 48 on the wheel 18, as seen at 49 in FIG. 3 of the drawing. It will, thus, be apparent that, as the rack 43 is advanced, the tube 13 will be fed in the direction of the cutter station; whereas, in the return movement of the rack 43, as later described, the ratchet 46 will simply ride over the spring-pressed pawl 47. In order to retain the feed wheel 18 against rotation, I employ a spring-pressed brake shoe 50 having a leather or other friction facing 51 which operates upon the drum 48, as clearly seen in FIG. 3. This engagement is not such as to interfere with the normal rotation of the wheel 18 in the feed drive thereof. The springs for actuating the shoe 50 are indicated at 52 in FIG. 1 of the drawing. The free end of the rack bar has an elongated aperture 53 opening through the end thereof and mounted in this bar is a knife actuating rod 54 having, at its free end, a suitable bearing support and guide 55. Fixed to the rod 54 is a collar 56. Between the collar 56 and the end of the bar 43 is a long coil spring 57, which normally supports the collar in engagement with the offset catch 58 of a trigger lever 59 suitably pivoted, as at 60, the other end of the lever having a coil spring 61 coupled therewith to normally support the catch 58 in the engaged position, shown in FIG. 1 of the drawing. The catch 58 has a bevelled surface 62 facilitating passage of the collar 56 over the catch in return movement of the parts, after the rod 54 has been advanced in actuating the L-shaped lever 63. The lever 63 has an end 64 disposed in the path of movement of the rod 54, the lever being pivoted, as seen at 65, and the other end 66 of the lever is arranged beneath and operatively engages the end portion 67 of the movable or pivoted knife 33 at the cutting station. The pivot of the knife 33 is illustrated at 68. The free end portion of the knife 33 has a rounded and bevelled cutter edge 69 and the stationary cutter 32 has a similar cutter edge, as indicated at 70 in FIG. 2 of the drawing. At 71, in FIGS. 1 and 2 of the drawing, is indicated the support for the stationary cutter 32 and mounted in connection with this support is a micro or other switch 72, the switch element of which is diagrammatically seen at 73, this element being arranged in alinement with the end 64 of the lever 63. It will, thus, be seen that, in actuation of the lever 63, the end 64 will actuate the switch 72 to break the circuit to the solenoid 40, which circuit will be energized through action of the vending machine, as mentioned above and working in conjunction with the electrical means controlling vending of the drink from the machine.

Coupled with the cutter 33 is a coil spring 74, the end of which is coupled with a support 75 fixed to the side plate 38, as clearly noted in FIG. 2 of the drawing. This spring 74, in addition to normally supporting the cutter 33 and lever 63 in the position shown in FIGS. 1 and 2, serves also to return the rod 54 to the position shown in FIG. 1, in other words, with the collar 56 in operative engagement with the catch 58.

The trigger lever 59 has, on its lower surface, a rounded trip portion 76 actuated by an upwardly protruding cam portion 77 at the free end of the rack bar 43. It will, thus, be seen that, in the actuation of the rack bar 43, the initial movement thereof will compress the spring 57 and the rod 54 will be held stationary until such time as the cam strikes the trip portion 76 to move the catch 58 out of engagement with the collar; whereupon, the rod 54 is released and suddenly advanced to operate the lever 63 and actuate the cutter 33 to cut the predetermined length of the tubing advanced to form the resulting workpiece 36. In this connection, it is important to note that the illustration in FIG. 1 of the drawing is purely diagrammatic or schematic, particularly from the standpoint of distances traveled, in order to advance the tube 13 sufficiently to form the workpiece or straw 36 of the desired length. To avoid any confusion in this regard, parts of the rack bar 43, rod 54 and lever 59 have been broken away. In this manner, a more complete showing of the mechanism is made possible on the drawing, as diagrammatically shown in FIG. 1. In this connection, it will also appear that part of the shaft 41 is also broken away.

From the foregoing description, it will appear that, in each cycle of operation of the dispensing device or mechanism, the tube 13 is advanced by actuation of the rollers 14 and 18 for a predetermined distance governing the length of the end product, straw or workpiece 36 to be dispensed. It will also be apparent that the cutter or severing means, such as the knives 32, 33, can be of any desired construction in severing the tube 13 at the cutter station and, in some types of products in connection with which the straws 36 are used, bevelled or angular cuts may be formed by suitable arrangement of and type of cutters employed. It will appear, from a consideration of FIG. 1 of the drawing, that two grooved rollers 78 and 79 are employed to guide the rack bar 43 and also to support the same in engagement with the pinion 44, the roller 78 being illustrated in FIG. 3 of the drawing as supported on the wall 38. In this connection, it will also be apparent that the pivot 68 is mounted on a bracket 80 suitably supported on the wall 38, as noted in FIG. 2 of the drawing, the pivot 65 also being supported on said wall 38. The pivot 29 is also preferably supported on the wall 38 and this pivot could constitute a shaft also having a bearing support in the wall 39, if desired. The pivot 60 of the trigger lever 59 will also be mounted on the wall 38.

Having fully described my invention, what I claim as new and desire to secure by Letters Patent is:

1. The combination with a vending machine for vending liquids, of an apparatus for forming and dispensing a straw, a spool supporting a supply of plastic tubing, a frame spaced with respect to said spool, two pairs of rollers for feeding plastic tubing from the spool into and through said frame, one roller in each pair being positively driven, one pair of rollers being mounted in the frame, the other pair of rollers being arranged adjacent said spool, said frame including two cutters widely spaced from the first pair of rollers, means in the frame for guiding the tubing from the first pair of rollers into position between and beyond said cutters, means for driving the driven roller of said frame in feeding a predetermined length of tubing through said guide means beyond the cutters, means in direct engagement with said driving means to then actuate at least one of the cutters to sever a predetermined straw length from the advanced tubing, means for supporting the formed straw in position on the vending machine to be accessible for manual removal, said second named means comprising a rack bar, means directly coupled with the rack bar for actuating said bar in one direction, the means for actuating said cutter comprising a lever, a rod mounted in connection with the rack bar and operatively engaging said lever in actuation of the cutter, a coil spring mounted on said rod between the end of the rack bar and a member fixed to the rod, a trigger lever operatively engaging said member in retaining said rod against movement during the feed stroke of said rack bar, and means on the rack bar operatively engaging the trigger lever to move the same into operative position in releasing the rod for actuation of the lever operating said cutter.

2. An apparatus as defined in claim 1, wherein the cutter actuated by said lever has tensional means for returning said lever, rod, rack bar and trigger lever into normal operative position.

3. An apparatus as defined in claim 2, wherein the means for actuating said rack bar in drive of said driven roller comprises a solenoid.

4. An apparatus as defined in claim 3, wherein a switch is employed actuated by the lever operating said cutter at the end of the feed stroke of said roller for breaking the circuit to said solenoid.

5. The combination with a vending machine for vending liquids, of an apparatus for forming and dispensing a straw, a spool supporting a supply of plastic tubing, a frame spaced with respect to said spool, two pairs of rollers for feeding plastic tubing from the spool into and through said frame, one roller in each pair being positively driven, one pair of rollers being mounted in the frame, the other pair of rollers being arranged adjacent said spool for drawing tubing from said spool, said frame including two cutters widely spaced from the first pair of rollers, means in the frame for guiding the tubing from the first pair of rollers into position between and beyond said cutters, means including a rack bar for driving both rollers, the driven roller of said frame being adapted to feed a predetermined length of tubing through said tubing guide means beyond the cutters, means in direct engagement with said rack bar driving means to then actuate at least one of the cutters to sever a predetermined straw length from the advanced tubing, and means for supporting the formed straw in position on the vending machine to be accessible for manual removal.

6. In an apparatus as defined in claim 5, wherein said last named means comprises a lever in operative engagement with the cutter, a tensionally checked rod mounted in said rack bar, and a catch device operatively engaging the rod withholding operation thereof during a period of feed of the workpiece in said apparatus.

7. In an apparatus as defined in claim 6, wherein tensional means is employed operatively engaging the cutter for returning said rod and rack bar to normal rest position, preparatory for the next successive feed of the workpiece.

References Cited in the file of this patent
UNITED STATES PATENTS

| | | |
|---|---|---|
| 1,210,973 | Ohmer | Jan. 2, 1917 |
| 2,872,007 | Robb | Feb. 3, 1959 |
| 2,953,955 | Underhill | Sept. 27, 1960 |